(12) United States Patent
Abu-Hamdeh et al.

(10) Patent No.: US 8,155,028 B2
(45) Date of Patent: Apr. 10, 2012

(54) METHOD AND APPARATUS FOR PROVIDING FULL LOGICAL CONNECTIVITY IN MPLS NETWORKS

(75) Inventors: Rateb Abu-Hamdeh, Kanata (CA); Joël Calippe, Sunnyvale, CA (US); Zihuang Wang, Kanata (CA)

(73) Assignee: Alcatel Lucent, Paris (FR)

( * ) Notice: Subject to any disclaimer, the term of this patent is extended or adjusted under 35 U.S.C. 154(b) by 395 days.

(21) Appl. No.: 12/049,743

(22) Filed: Mar. 17, 2008

(65) Prior Publication Data

US 2009/0232029 A1  Sep. 17, 2009

(51) Int. Cl.
   *H04L 12/28* (2006.01)
(52) U.S. Cl. .......................................................... 370/254
(58) Field of Classification Search .................. None
   See application file for complete search history.

(56) References Cited

U.S. PATENT DOCUMENTS

| | | | | |
|---|---|---|---|---|
| 6,665,273 | B1 * | 12/2003 | Goguen et al. ................. | 370/252 |
| 6,680,943 | B1 * | 1/2004 | Gibson et al. .................. | 370/392 |
| 7,082,102 | B1 * | 7/2006 | Wright ........................... | 370/229 |
| 7,151,775 | B1 * | 12/2006 | Renwick et al. ............... | 370/400 |
| 2002/0181485 | A1 * | 12/2002 | Cao et al. ....................... | 370/419 |
| 2005/0117592 | A1 * | 6/2005 | Nagami et al. ................. | 370/401 |
| 2006/0126496 | A1 | 6/2006 | Filsfils et al. | |
| 2007/0121486 | A1 | 5/2007 | Guichard et al. | |
| 2007/0177523 | A1 * | 8/2007 | Nagami et al. ................. | 370/252 |
| 2007/0286069 | A1 * | 12/2007 | Xu .................................. | 370/218 |
| 2008/0310326 | A1 * | 12/2008 | Shaw et al. ..................... | 370/254 |
| 2009/0304380 | A1 * | 12/2009 | Sadananda et al. ............. | 398/26 |

FOREIGN PATENT DOCUMENTS

WO  WO 03/003138 A  1/2003

OTHER PUBLICATIONS

International Search Report and Written Opinion mailed Sep. 3, 2009 in PCT/IB2009/052733, Alcatel Lucent, Applicant, 14 pages.

* cited by examiner

*Primary Examiner* — Chirag Shah
*Assistant Examiner* — Jenkey Van
(74) *Attorney, Agent, or Firm* — Wall & Tong, LLP

(57) ABSTRACT

The invention includes a method and apparatus for configuring logical connectivity for a network comprising a plurality of nodes. A method includes determining a physical topology of the network, determining a set of LSP paths based on the physical topology of the network, and determining a set of LSPs using the set of LSP paths, where the set of LSPs includes a plurality of LSPs adapted for providing full logical connectivity between the nodes of the network. The physical topology is determined using information indicative of physical connectivity between nodes of the network. The set of LSP paths includes, for each pair of nodes in the network, at least two logical paths between the nodes of the node pair. The set of LSPs includes a plurality of LSPs adapted for providing full logical connectivity between the nodes of the network. The full logical connectivity between the nodes of the network may be maintained in response to physical topology change events, such as addition of nodes to the network removal of nodes from the network, and the like.

20 Claims, 7 Drawing Sheets

100

200

400

500

METHOD AND APPARATUS FOR PROVIDING FULL LOGICAL CONNECTIVITY IN MPLS NETWORKS

FIELD OF THE INVENTION

The invention relates to the field of communication networks and, more specifically, to multi-protocol label switching (MPLS) networks.

BACKGROUND OF THE INVENTION

Multiprotocol Label Switching (MPLS) enables efficient delivery of a wide variety of differentiated, end-to-end services. MPLS supports delivery of such services using label switched paths (LSPs). Depending on different factors, hundreds or even thousands of LSPs may be provisioned in a given MPLS network. As network conditions change, LSPs provisioned in a given MPLS network often need to be changed. Disadvantageously, however, determining and provisioning of LSPs in existing MPLS networks is currently performed manually via a user interface of a network management system (NMS) by individually determining and provisioning each LSP by using the Command Line Interface (CLI) access point on individual nodes.

SUMMARY OF THE INVENTION

Various deficiencies in the prior art are addressed through the invention of a method and apparatus for configuring logical connectivity for a network comprising a plurality of nodes. A method includes determining a physical topology of the network, determining a set of LSP paths based on the physical topology of the network, and determining a set of LSPs using the set of LSP paths, where the set of LSPs includes a plurality of LSPs adapted for providing full logical connectivity between the nodes of the network. The physical topology is determined using information indicative of physical connectivity between nodes of the network. The set of LSP paths includes, for each pair of nodes in the network, at least two logical paths between the nodes of the node pair. The set of LSPs includes a plurality of LSPs adapted for providing full logical connectivity between the nodes of the network. The full logical connectivity between the nodes of the network may be maintained in response to physical topology change events, such as addition of nodes to the network removal of nodes from the network, and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention determines full logical connectivity within an MPLS network. The full logical connectivity is determined using the physical topology of the network (e.g., based on information indicative of the physical connectivity between nodes of the MPLS network). The physical topology may be used to determine a set of LSP paths for the MPLS network. The set of LSP paths for the MPLS network may then be used to determine a set of LSPs adapted to provide full logical connectivity within the MPLS network. This enables provisioning of full logical connectivity within the MPLS network. Although primarily depicted and described herein within the context of MPLS networks, logical connectivity determination/provisioning functions depicted and described herein may be applied to other networks.

Figure 1:
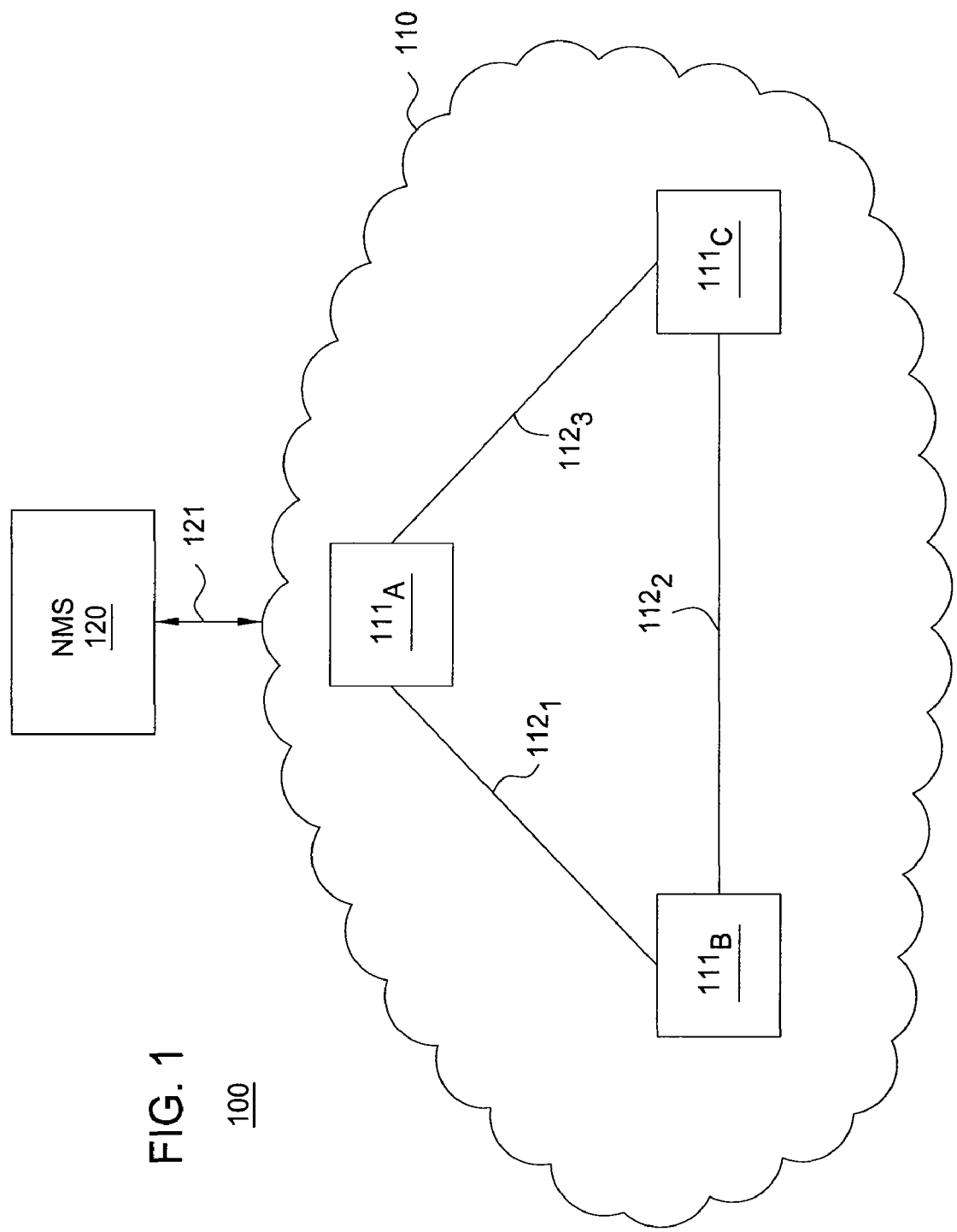
FIG. 1 depicts a high-level block diagram of a communication network architecture.

FIG. 1 depicts a high-level block diagram of a communication network architecture. Specifically, communication network architecture 100 includes a communication network (CN) 110 and a network management system (NMS) 120. The NMS 120 and CN 110 communicate via a communicate path 121. The NMS 120 is adapted for managing CN 110. The NMS 120 receives information from CN 110 (e.g., information adapted for use in determining logical connectivity within CN 110). The NMS 120 transmits information to CN 110 (e.g., configuration information adapted for use in provisioning logical connectivity within CN 110). The CN 110 includes a plurality of nodes $111_A$-$111_C$ (collectively, nodes 111).

The nodes 111 include communication nodes capable of supporting communications using logical paths (e.g., using MPLS label switched paths (LSPs)). For example, nodes 111 may include routers, switches, and the like. The nodes 111 are physically connected to form a network topology. The nodes 111 are physically connected in a ring topology using a plurality of physical links $112_1$-$112_3$ (collectively, physical links 112). The physical link $112_1$ connects nodes $111_A$ and $111_B$. The physical link $112_2$ connects nodes $111_B$ and $111_C$. The physical link $112_3$ connects nodes $111_C$ and $111_A$. In one embodiment, CN 110 is an MPLS network.

The nodes 111 are further configured to support communications using logical paths. The nodes 111 are configured for IP connectivity (e.g., by configuring one or more IP interfaces on each of the nodes 111). The nodes 111 may also be configured to support one or more routing protocols, such as Open Shortest Path First (OSPF), Intermediate System to Intermediate System (IS-IS), and the like. The nodes 111 may be configured to support other communications functions/protocols. These configurations may be performed in any manner (the details of which are omitted for purposes of clarity).

The nodes 111 are configured to support full logical connectivity using LSPs between nodes 111. The LSPs may include strict dynamic LSPs, loose dynamic LSPs, and the like, as well as various combinations thereof. The LSPs may include primary LSPs, secondary LSPs, fast reroute (FRR) LSP protection hops lists, and the like, as well as various combinations thereof. In one embodiment, LSPs may be configured to provide full logical connectivity between nodes 111 of CN 110 at the MPLS layer. The provisioning of full logical connectivity between nodes 111 using LSPs (i.e., determination of LSPs for providing full logical connectivity, and associated configuration of the nodes 111 to support such LSPs) is performed by NMS 120.

Although primarily depicted and described herein with respect to a ring topology (for purposes of clarity in depicting and describing the logical connectivity determination/provisioning functions), the logical connectivity determination/provisioning functions depicted and described herein may be performed in communication networks configured using any physical topology (e.g., using one or more of a linear bus topology, a distributed bus topology, a star topology, a tree-type topology, a mesh topology, and the like, as well as various combinations thereof).

The NMS 120 is a network management system adapted for performing the logical connectivity determination/provisioning functions depicted and described herein. The NMS 120 is adapted to communicate with nodes of CN 110. The NMS 120 may also be adapted to communicate with other operations support systems (e.g., Element Management Systems (EMSs), Topology Management Systems (TMSs), and the like, as well as various combinations thereof). The NMS 120 supports user interface capabilities. The user interface capabilities enable one or more users to perform various functions (e.g., enter information, review information, initiate execution of methods adapted for determining/establishing/modifying logical connectivity, and the like, as well as various combinations thereof).

The NMS 120 is adapted to perform functions of the present invention. The NMS 120 is adapted to perform methods for establishing/maintaining full logical connectivity between nodes of CN 110. In one embodiment, in which CN 110 is an MPLS network, NMS 120 establishes and maintains full logical connectivity between nodes of CN 110 at the MPLS layer using LSPs. The NMS 120 determines a set of LSPs which provides full logical connectivity between nodes of CN 110, generates configuration information adapted for configuring the nodes of CN 110 to support the set of LSPs, and propagates the configuration information to CN 110 for configuring the nodes of CN 110 to support the set of LSPs. The NMS 120 interacts with CN 110 (and, optionally, with other systems) in order to establish/maintain full logical connectivity between nodes of CN 110.

The NMS 120 receives information via a user interface. For example, users may manually enter information associated with CN 110. For example, users may manually enter information associated with each node (e.g., the type of node, the node identifier, configuration information (e.g., shelf, slot, card, port, and like information), the geographic location of the node, and the like, as well as various combinations thereof), information describing physical connectivity of the nodes, and the like, as well as various combinations thereof. The NMS 120 may receive any other information which may be entered into a management system via a user interface.

The NMS 120 receives information from CN 110. The NMS 120 receives information from nodes of the network topology of CN 110, from other elements of CN 110, and the like, as well as various combinations thereof. The NMS 120 also may receive information from other operations support systems (e.g., Element Management Systems (EMS), Topology Management Systems (TMSs), Network Monitoring Systems (NMSs), and the like, as well as various combinations thereof). The NMS 120 may receive information from any other source of information which may be used in logical connectivity determination/provisioning functions depicted and described herein.

The NMS 120 may receive any information adapted for determining, provisioning, and maintaining full logical connectivity between nodes of CN 110. For example, NMS 120 may receive physical connectivity information (e.g., information indicative of the physical topology of CN 110 and/or which may be used to determine the physical topology of CN 110), network status information (e.g., physical topology change event notifications, port status notifications, physical link status notifications, logical connectivity status notifications, and the like), and the like, as well as various combinations thereof.

The NMS 120 may receive information from CN 110 in any manner. For example, NMS 120 may receive information from CN 110 by initiating queries to CN 110, by receiving automatic reporting from CN 110, by listening to (e.g., snooping) routing update messages being exchanged within CN 110, and the like, as well as various combinations thereof. In one embodiment, for example, NMS 120 may use the Link Layer Discovery Protocol (LLDP, standardized as IEEE 802.1AB), which enables network management systems to discover the topology of a network using information available in the Management Information Bases (MIBs) of network elements of the network. In one embodiment, NMS 120 may receive OSPF update messages. The NMS 120 may receive, detect, or otherwise obtain information from CN 110 in various other ways.

The NMS 120 propagates information to CN 110 (e.g., to nodes of the network topology of CN 110). The NMS 120 may propagate any information adapted for establishing and maintaining full logical connectivity between nodes of CN 110 (e.g., configuration information adapted for configuring nodes 111 to support logical connections). For example, NMS 120 may propagate configuration messages adapted for establishing new LSPs between nodes 111, modifying existing LSPs between nodes 111 (e.g., modifying the hop lists used by respective LSPs), deleting existing LSPs between nodes 111, and the like, as well as various combinations thereof. The NMS 120 may propagate any other information adapted for establishing and maintaining full logical connectivity between nodes of CN 110.

The NMS 120 may propagate configuration information to CN 110 in any manner. The NMS 120 may propagate configuration information to CN 110 using any management protocol (which may depend on the types of nodes for which the configuration information is intended). For example, NMS 120 may propagate configuration information to CN 110 using one or more of NETCONF, Simple Network Management Protocol (SNMP), Extensible Markup Language (XML), Common Management Information Protocol (CMIP), Transaction Language 1 (TL1), Command Line Interface (CLI), and the like, as well as various combinations thereof.

The NMS 120 may be adapted to support other functions. The NMS 120 may support network topology configuration functions (e.g., configuring a physical network topology, modifying a physical network topology, configuring new nodes added to a network, deleting existing nodes removed from a network, and the like, as well as various combinations thereof. The NMS may determine modified sets of LSP paths, modified sets of LSPs, and the like (e.g., in response to a manual request from a user, in response to detection of a physical topology change event, and the like). The NMS may perform network connectivity validation functions. The NMS may perform any other functions described herein.

Figure 2:
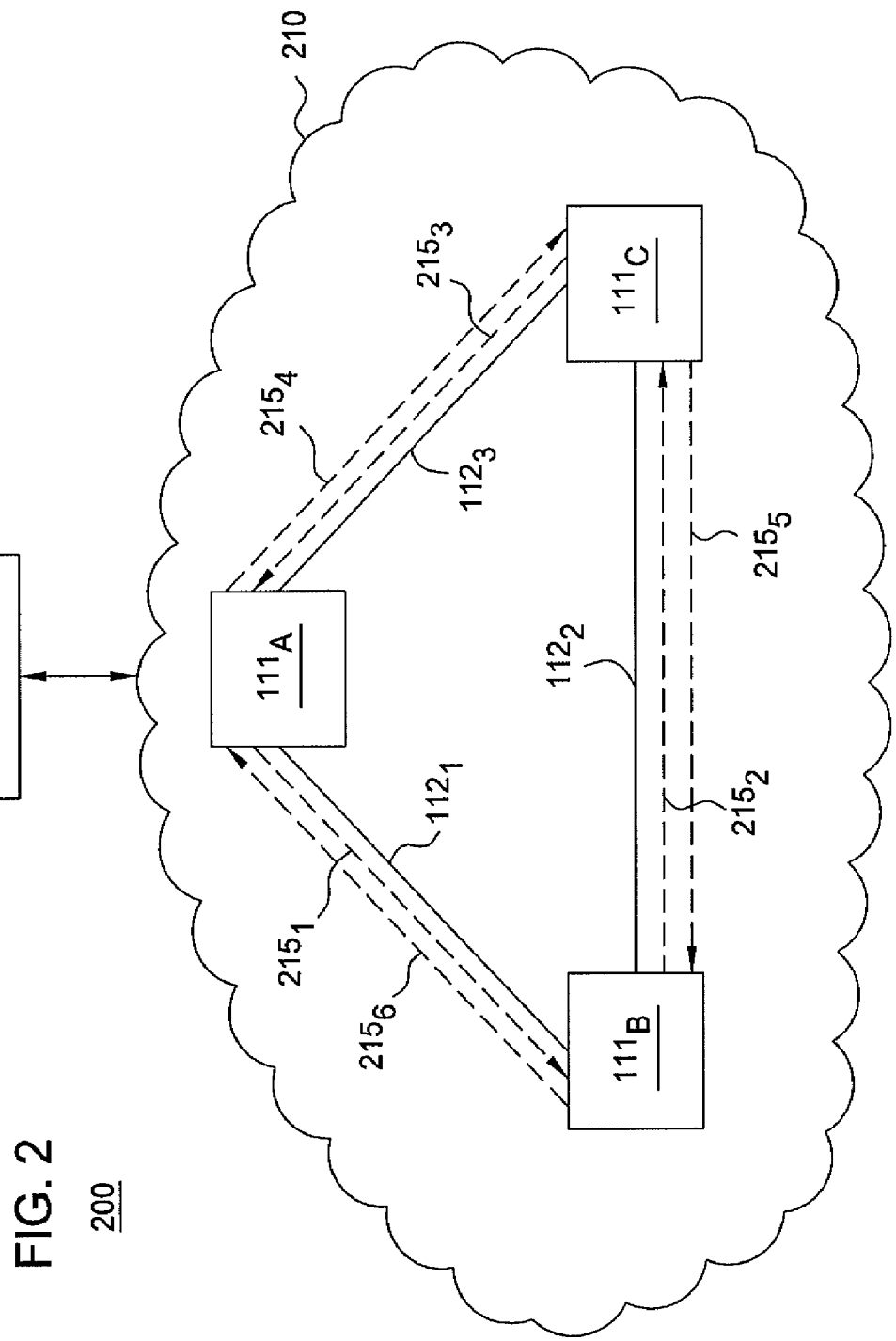
FIG. 2 depicts a high-level block diagram of a communication network architecture.

FIG. 2 depicts a high-level block diagram of a communication network architecture. Specifically, communication network architecture 200 includes CN 110 and NMS 120 depicted and described with respect to FIG. 1. The CN 110 includes nodes 111, which are physically connected in a ring topology. As depicted in FIG. 2, nodes $111_A$ and $111_B$ are connected, nodes $111_B$ and $111_C$ are connected, and nodes $111_C$ and $111_A$ are connected. The nodes 111 are configured for IP connectivity. The nodes 111 are configured to support one or more routing protocols. The NMS 120 determines and establishes full logical connectivity (using LSPs) between nodes 111 based on the physical topology of CN 210.

The NMS 120 determines a physical topology of CN 210 based on physical connectivity between nodes 111 of CN 210. The physical connectivity between nodes 111 is specified using physical connectivity information (e.g., using associations between physical ports and physical links). The NMS 120 may obtain physical connectivity information from one or more sources of such information. For example, NMS 120 may obtain physical connectivity information from nodes 111 (e.g., by querying nodes 111, from automatic reporting of information from nodes 111, by listening to routing update messages sent by nodes 111, and the like, as well as various combinations thereof), from a user interface of NMS 120, from one or more other systems (e.g., NMSs, EMSs, or other systems), and the like.

The NMS 120 determines a set of LSP paths which may be supported by nodes 111. The NMS 120 determines the set of LSP paths between nodes 111 based on the physical topology of CN 210 (i.e., based on the physical connectivity between nodes 111). In one embodiment, the set of LSP paths includes all possible LSP paths based on the physical topology of CN 210. An LSP path is a path from a source node to a destination node (which may or may not include an intermediate node(s)) which may be the path followed by one or more LSPs. An LSP path does not propagate traffic; rather, an LSP path merely specifies a path which may be used by one or more LSPs. The set of LSP paths may be determined (based on the physical topology of CN 210) in a number of ways.

As depicted in FIG. 2, since the physical topology of nodes 111 is a three-node ring, the set of all possible LSP paths which may be supported by nodes 111 includes 12 LSP paths. The LSP paths in the set of LSP paths include (in terms of the subscripts by which nodes 111 are identified, where the first node in the list is the source of the LSP path and the last node in the list is the destination of the LSP path): (1) A-B; (2) A-B-C; (3) A-C; (4) A-C-B; (5) B-A; (6) B-A-C; (7) B-C; (8) B-C-A; (9) C-A; (10) C-A-B; (11) C-B; and (12) C-B-A. In other words, there are two LSP paths from $111_A$ to $111_B$, two LSP paths from $111_B$ to $111_A$, two LSP paths from $111_A$ to $111_C$, two LSP paths from $111_C$ to $111_A$, two LSP paths from $111_B$ to $111_C$, and two LSP paths from $111_C$ to $111_B$.

The NMS 120 determines a set of LSPs which provide full logical connectivity between nodes 111. The NMS 120 determines the set of LSPs using the set of all possible LSP paths between nodes 111. As depicted in FIG. 2, since there are two possible LSP paths from every node 111 to every other node 111, and full logical connectivity between nodes 111 may be provided using at least one logical connection from every node 111 to every other node 111, the set of LSPs which provides full logical connectivity between nodes 111 includes at least 6 LSPs (which use 6 of the 12 LSP paths determined by NMS 120).

In the example of FIG. 2, the set of LSPs which provides full logical connectivity between nodes 111 includes the following LSPs (where the arrow indicates the direction from source node to destination node of the LSP): (1) node $111_A \rightarrow$ node $111_B$ (denoted as LSP $215_1$); (2) node $111_B \rightarrow$ node $111_C$ (denoted as LSP $215_2$); (3) node $111_C \rightarrow$ node $111_A$ (denoted as LSP $215_3$); (4) node $111_A \rightarrow$ node $111_C$ (denoted as LSP $215_4$); (5) node $111_C \rightarrow$ node $111_B$ (denoted as LSP $215_5$); and (6) node $111_B \rightarrow$ node $111_A$ (denoted as LSP $215_6$). The LSPs $215_1$-$215_6$ may be collectively referred to as LSPs 215. In one embodiment, LSPs 215 comprise primary LSPs.

In the example of FIG. 2, for purposes of clarity, the LSP paths having the shortest hop count (or cost) have been selected as the paths for the LSPs (for purposes of clarity). The selection of LSP paths for use as LSPs may be performed based on various other factors. For example, where multiple LSPs paths are available for selection to be used by an LSP, selection of one of the LSP paths to be used as the LSP may be performed based on factors such as equipment information (e.g., port, status, speed, and bandwidth), current usage of intermediate nodes, reliability of the link or hop list between source and destination, and the like, as well as various combinations thereof.

In other words, one or more of the other LSP paths from the set of LSP paths could have been selected as a path(s) to be used for one or more of the LSPs of the set of LSPs, as long as full logical connectivity between nodes 111 resulted. For example, for logical connectivity from node $111_A$ (the source node) to node $111_C$ (the destination node), the LSP path A-B-C could have been selected (in place of the LSP path A-C, which was selected in the example of FIG. 2). Similarly, for example, for logical connectivity from node $111_B$ to node $111_A$, the LSP path B-C-A could have been selected (in place of the LSP path B-A, which was selected in the example of FIG. 2). In this manner, other LSP paths from the set of LSP paths may have been selected for use as the paths for others of the LSPs.

In one embodiment, in addition to determining the set of LSPs which provide full logical connectivity between nodes 111, NMS 120 may also determine additional LSPs which may be configured in CN 210. In one embodiment, for example, in which the set of LSPs which provide full logical connectivity between nodes 111 includes primary LSPs, NMS 120 may also determine one or more secondary LSPs which may be configured between nodes 111, one or more FRR LSP protection paths, and the like, as well as various combinations thereof.

In one such embodiment, for example, in which the set of LSPs which provide full logical connectivity between nodes 111 includes primary LSPs and the NMS 120 determines additional secondary LSPs to be configured between nodes 111, NMS 120 may determine the secondary LSPs such that each secondary LSP provides a failover path for an associated one of the primary LSPs, respectively. In the example of FIG. 2, the LSP paths having the shortest hop count have been selected as the paths for the primary LSPs. In continuation of this example, the six remaining LSP paths not selected for use as the primary LSPs may be selected for use as the secondary LSPs (e.g., as protection for the respective primary LSPs). The secondary LSPs may be selected in various other ways. The secondary LSPs are omitted for purposes of clarity.

The LSPs in the set of LSPs will provide full logical connectivity between nodes 111 (after the determined LSPs are configured on nodes 111). As described herein, each LSP provides a logical connection from a source node to a destination node (i.e., each LSP is a unidirectional connection). The determination of the set of LSPs may also include determining information associated with each LSP in the set of LSPs (and, thus, required to be configured on the nodes 111 to support each LSP in the set of LSPs). In one embodiment, the information associated with each LSP may vary for different types of LSPs (e.g., varying for strict dynamic LSPs, loose dynamic LSPs, and the like).

In an embodiment, in which strict dynamic LSPs are provisioned, each LSP uses a hops list in order to specify the path to be taken by that LSP (i.e., the path from source node to destination node). A hops list for an LSP may be included as part of the LSP object or may be a separate object that is linked to the LSP object. A hops list for an LSP is configured on the source node of that LSP (since traffic to be routed on that LSP must be routed from the source node to the destination node, which may include one or more intermediate hops). The hops list for each LSP is determined by NMS 120.

In the example of FIG. 2, if LSPs 215 determined for nodes 111 are strict dynamic LSPs, LSP 215$_1$ has an associated hop list (A→B) configured on node 111$_A$, LSP 215$_2$ has an associated hop list (B→C) configured on node 111$_B$, LSP 215$_3$ has an associated hop list (C→A) configured on node 111$_C$, LSP 215$_4$ has an associated hop list (A→C) configured on node 111$_A$, LSP 215$_5$ has an associated hop list (C→B) configured on node 111$_C$, and LSP 215$_6$ has an associated hop list (B→A) configured on node 111$_B$. In an embodiment in which the secondary LSPs are determined (in addition to the primary LSPs 215), each secondary LSP also uses an associated hops list.

In an embodiment in which loose dynamic LSPs are provisioned, each LSP uses endpoint information to specify the source node of the LSP and the destination node of the LSP (i.e. the LSP may be routed over any path that is available between the specific source and destination nodes). The endpoint information for an LSP may be included as part of the LSP object or may be a separate object that is linked to the LSP object. The endpoint information for an LSP is configured on the source node of that LSP. The endpoint information for each LSP is determined by NMS 120.

As described herein, after determining the set of LSP paths based on the physical connectivity between nodes 111 and determining the set of LSPs which provide full logical connectivity between nodes 111 (and, optionally, any additional LSPs), the NMS 120 generates configuration information adapted for configuring nodes 111 to support the determined LSPs (i.e., LSPs of the set of LSPs which provide full logical connectivity and, optionally, additional LSPs). The NMS 120 propagates the generated configuration information to nodes 111. The nodes 111 receive the configuration information from NMS 120. The nodes 111 process the received configuration information, thereby resulting in provisioning of the LSPs within CN 210. A method according to one such embodiment is depicted and described with respect to FIG. 3.

Figure 3:
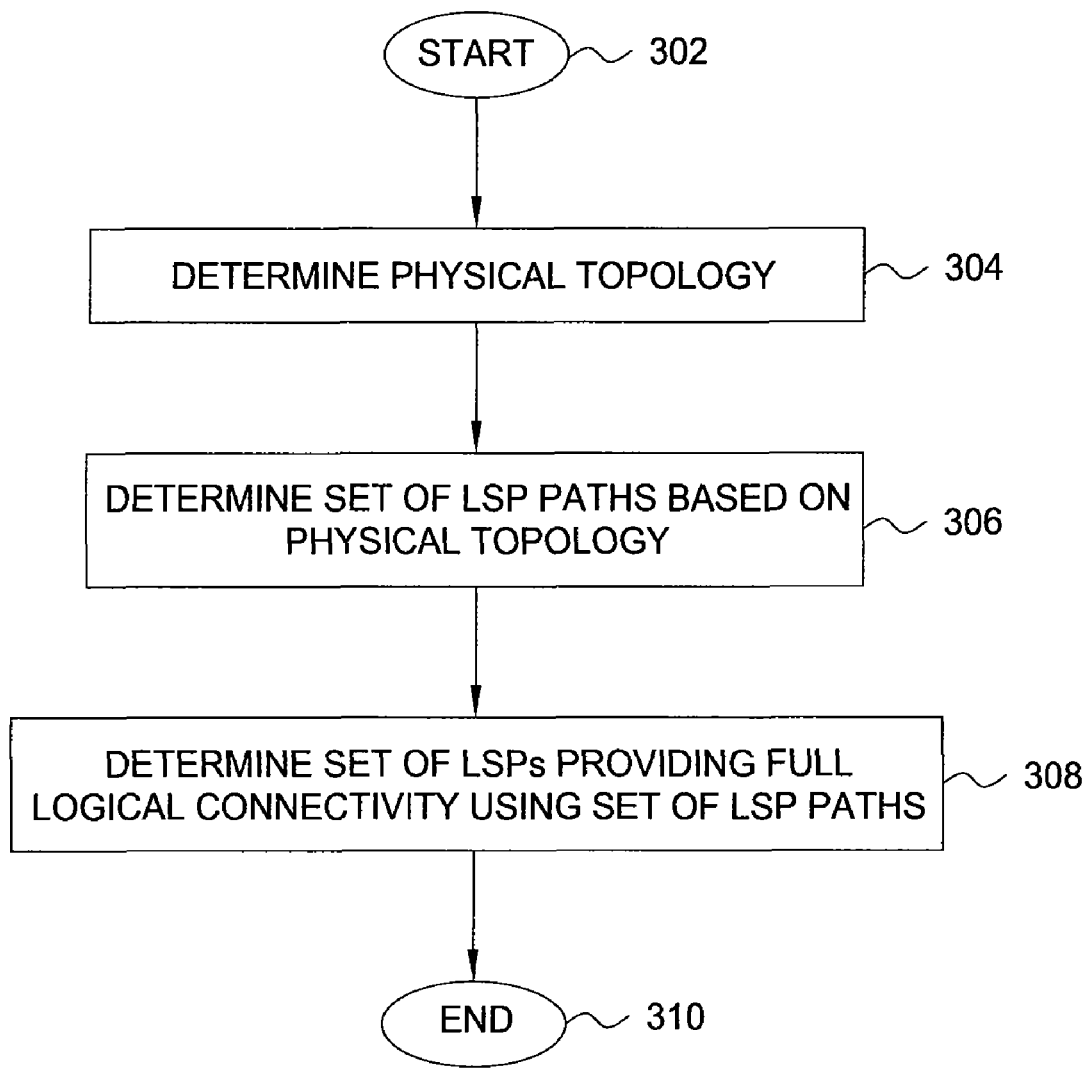
FIG. 3 depicts a method according to one embodiment of the present invention.

FIG. 3 depicts a method according to one embodiment of the present invention. The method 300 of FIG. 3 includes a method for determining full logical connectivity based on physical topology. The method 300 may be performed for a network or only a portion of a network (e.g., a topology group, an Autonomous System (AS), and the like). Although depicted and described as being performed serially, at least a portion of the steps of method 300 may be performed contemporaneously, or in a different order than depicted and described with respect to FIG. 3. The method 300 begins at step 302 and proceeds to step 304.

At step 304, physical topology is determined. The physical topology may be determined using physical connectivity information describing physical connections between nodes of the network, which, as described herein, may be received from various sources (e.g., nodes of the network, one or more management systems, and the like). The physical topology may be determined by listening to routing update messages exchanged between nodes and processing the routing update messages to determine the physical topology. The physical topology may be determined in other ways.

At step 306, a set of LSP paths is determined based on the physical topology. The set of LSP paths includes, for each pair of nodes in the network, at least two logical paths between the nodes of the node pair. At step 308, a set of LSPs providing full logical connectivity is determined. The set of LSPs is determined using the set of LSP paths. These steps may be better understood by way of reference to FIG. 2.

At step 310, method 300 ends. Although depicted and described as ending (for purposes of clarity in describing the manner in which the set of LSPs is determined), each LSP in the determined set of LSPs is provisioned in the network. For example, the LSPs in the determined set of LSPs may be provisioned in the network by generating configuration information for the LSPs and propagating the configuration information for the LSPs to the network.

As described herein, after full logical connectivity between nodes of a network is established, one or more topology change events may occur which result in a change to the physical topology of the network (e.g., addition of a new node to the network topology, deletion of an existing node from the network topology, and the like, as well as various combinations thereof). A method for reconfiguring LSPs to maintain full logical connectivity in response to a new node being added to the network is depicted and described with respect to FIG. 4 and FIG. 6. A method for reconfiguring LSPs to maintain full logical connectivity in response to an existing node being deleted from the network is depicted and described with respect to FIG. 5 and FIG. 6.

Figure 4:
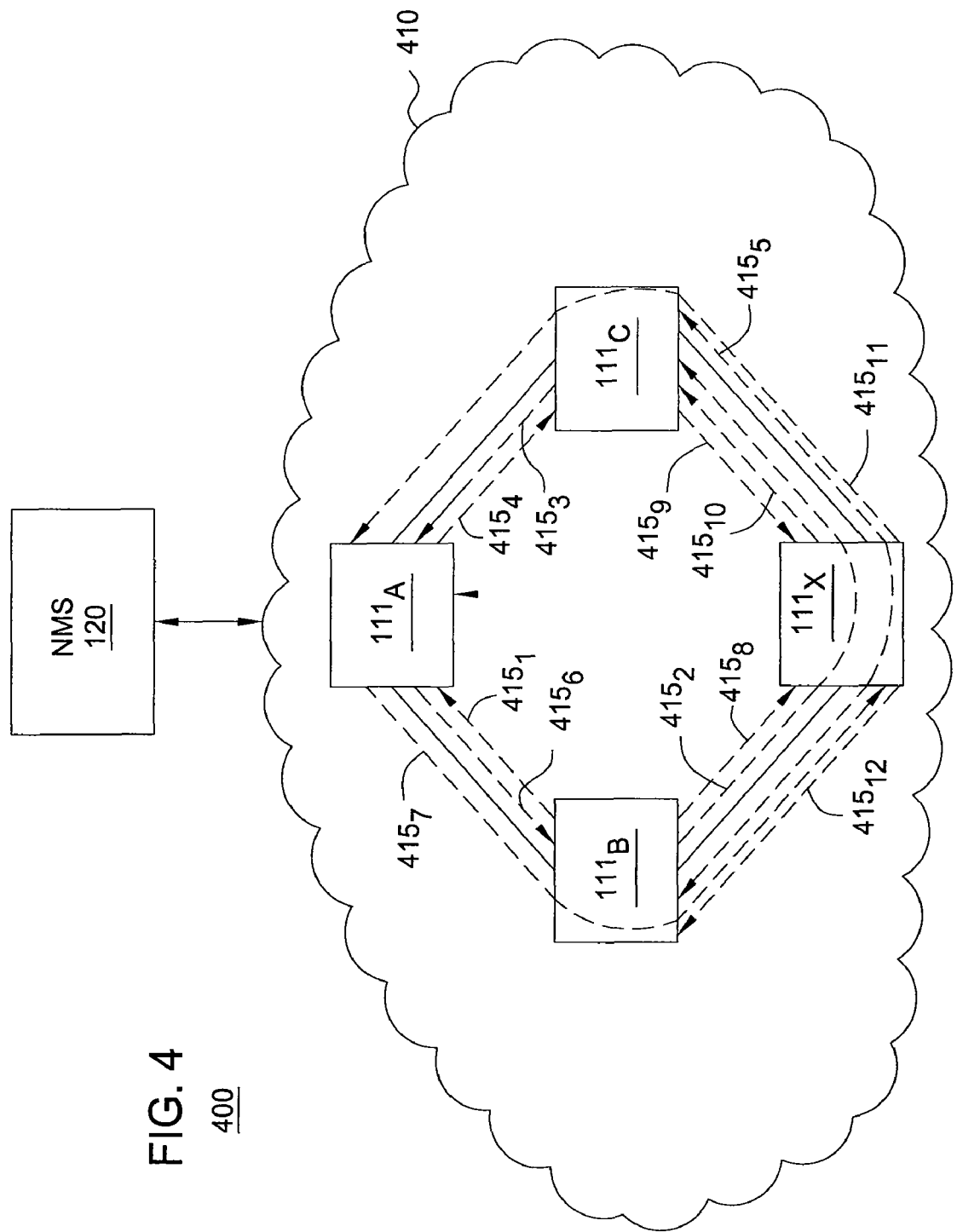
FIG. 4 depicts a high-level block diagram of the communication network of FIG. 2 in which a new node has been added to the communication network.

FIG. 4 depicts a high-level block diagram of the communication network of FIG. 2 in which a new node has been added to the communication network. Specifically, communication network 400 includes a CN 410 and NMS 120. The CN 410 of FIG. 4 is similar to CN 210 of FIG. 2, however, a new node 111$_X$ has been added to the ring topology. The node 111$_X$ is added between nodes 111$_B$ and 111$_C$ such that nodes 111$_B$ and 111$_C$ are no longer physically connected (rather, nodes 111$_B$ and 111$_X$ are connected by a physical link 112$_{X1}$ and nodes 111$_X$ and 111$_C$ are connected by a physical link 112$_{X2}$). The node 111$_X$ is configured for IP connectivity. The node 111$_X$ may also be configured to support one or more routing protocols (e.g., OSPF, IS-IS, and the like).

The addition of node 111$_X$ to the network topology is a physical topology change event. The NMS 120 may be informed of the physical topology change event in any manner. In one embodiment, NMS 120 may learn of the addition of node 111$_X$ using information entered via a user interface of NMS 120. In one embodiment, NMS 120 may learn of the addition of node 111$_X$ using information received from CN 410. The information may be directly indicative of the physical topology change event or indirectly indicative of the physical topology change event (i.e., where NMS 120 may need to perform some processing of received information in order to detect the physical topology change event). The NMS 120 may learn of the physical topology change event in any other manner.

The NMS 120, in response to the physical topology change event, initiates processing adapted to maintain full logical connectivity between nodes 111 of CN 410. The NMS 120 determines changes to the set of LSP paths. The NMS 120 determines changes to the set of LSPs that are required to provide full logical connectivity between nodes 111 of CN 410. In this embodiment, since the physical topology change event involves the addition of a new node to CN 410, the changes to the set of LSPs required to support full logical connectivity between nodes of CN 410 includes determination of one or more additional LSPs to be included in the set of LSPs (and, optionally, where strict dynamic LSPs are used, modification of one or more existing LSPs (e.g., modifying the hops list(s) of one or more existing LSPs).

The NMS 120 determines the set of all possible LSP paths for CN 410 based on the physical connectivity of nodes 111. In this embodiment, since the physical topology change event involves the addition of a new node $111_X$ to CN 410, additional LSP paths are supported by CN 410 (as compared with CN 210). The NMS 120 may replace the existing set of LSP paths or modify the existing set of LSP paths (i.e., by determining how the existing set of LSP paths has changed based on the physical topology change event). As depicted in FIG. 4, since the physical topology of CN 410 is a four-node ring, the set of all possible LSP paths which may be supported by nodes 111 includes 24 LSP paths (including some of the LSP paths supported by CN 210, as well as additional LSP paths).

The set of all possible LSP paths includes the following LSP paths (in terms of the subscripts by which nodes 111 are identified, where the first node in the list is the source of the LSP path and the last node in the list is the destination of the LSP path): (1) A-B; (2) A-B-X; (3) A-B-X-C; (4) A-C; (5) A-C-X; (6) A-C-X-B; (7) B-X (8) B-X-C; (9) B-X-C-A; (10) B-A; (11) B-A-C; (12) B-A-C-X; (13) X-C; (14) X-C-A; (15) X-C-A-B; (16) X-B; (17) X-B-A; (18) X-B-A-C; (19) C-A; (20) C-A-B; (21) C-A-B-X; (22) C-X; (23) C-X-B; and (24) C-X-B-A. In other words, 6 of the 12 LSP paths of the previous set of LSP paths (i.e., the LSP paths A-B, A-C, B-A, B-A-C, C-A, and C-A-B for CN 210) are included in the modified list of LSP paths.

The NMS 120 determines the set of LSPs that is required to provide full logical connectivity between nodes 111 of CN 410. The NMS 120 determines the changes to the set of LSPs using the set of LSPs and the modified set of all possible LSP paths between nodes 111. As depicted in FIG. 4, since there are two possible LSP paths from every node 111 to every other node 111, and full logical connectivity between nodes 111 may be provided using logical connections from every node 111 to every other node 111, the set of LSPs which provides full logical connectivity between nodes 111 includes 12 LSPs (which use 12 of the 24 LSP paths determined by NMS 120).

The NMS 120 determines that the addition of node $111_X$ between nodes $111_B$ and $111_C$ does not impact LSPs $215_1$, $215_3$, $215_4$, or $215_6$ because none of these LSPs follow a path between nodes $111_B$ and $111_C$. In other words, LSPs $215_1$, $215_3$, $215_4$, and $215_6$ may each continue to function without any modification (i.e., without any modification to the existing hops paths associated with these LSPs and, thus, without any reconfiguration of the associated nodes 111) in order to provide bidirectional logical connectivity between nodes $111_A$ and $111_B$ and between nodes $111_A$ and $111_C$. As depicted in FIG. 4, these unmodified LSPs are denoted as LSPs $415_1$, $415_3$, $415_4$, and $415_6$.

The NMS 120 determines that the addition of node $111_X$ between nodes $111_B$ and $111_C$ does impact LSPs $215_2$ and $215_5$ because each of these LSPs follows a path between nodes $111_B$ and $111_C$. The NMS 120 determines the impact to the hops lists for LSPs $215_2$ and $215_5$, respectively. The hops list for LSPs $215_2$ is updated from B-C to B-X-C such that traffic from node $111_B$ to node $111_C$ is routed via node $111_X$. The hops list for LSPs $215_5$ is updated from C-B to C-X-B such that traffic from node $111_B$ to node $111_C$ is routed via node $111_X$. As depicted in FIG. 4, these modified LSPs are denoted as LSPs $415_2$ and $415_6$.

The NMS 120 determines any additional LSPs that are required to maintain full logical connectivity between nodes 111 of CN 410. The NMS 120 determines the additional LSPs using the modified set of LSPs paths (i.e., by selecting one of the two available LSP paths from every node 111 to every other node 111 as the path for the LSP). As described herein, selection between multiple available LSP paths may be performed based on one or more factors such as equipment information (e.g., port, status, speed, and bandwidth), current usage of intermediate nodes, reliability of the link or hop list between source and destination, and the like, as well as various combinations thereof.

In the example of FIG. 4, the additional LSPs selected to provide full logical connectivity between nodes 111 of CN 410 include the following LSPs (where the arrow indicates the direction from source node to destination node of the LSP): (7) node $111_A$→node $111_B$→node $111_X$ (denoted as LSP $415_7$); (8) node $111_B$→node $111_X$ (denoted as LSP $415_8$); (9) node $111_C$→node $111_X$ (denoted as LSP $415_9$); (10) node $111_X$→node $111_C$ (denoted as LSP $415_{10}$); (11) node $111_X$→node $111_C$→node $111_A$ (denoted as LSP $415_{11}$); and (12) node $111_X$→node $111_B$ (denoted as LSP $415_{12}$).

In other words, some of the other LSP paths from the set of LSP paths could have been selected as the path(s) to be used for some of the additional LSPs of the set of LSPs, as long as full logical connectivity between nodes 111 of CN 410 resulted. For example, for logical connectivity from node $111_B$ (the source node) to node $111_X$ (the destination node), the LSP path B-A-C-X could have been selected (in place of the LSP path B-X, which was selected in the example of FIG. 4). Similarly, for example, for logical connectivity from node $111_X$ to node $111_A$, the LSP path X-B-A could have been selected (in place of the LSP path X-C-A). In this manner, other LSP paths from the set of LSP paths may have been selected as the paths for others of the additional LSPs of the set of LSPs.

In one embodiment, LSPs 415 include primary LSPs. In one such embodiment, in addition to determining the set of primary LSPs which provide full logical connectivity between nodes 111, NMS 120 may also determine other types of LSPs which may be configured in CN 210. In one embodiment, for example, in which the set of LSPs which provide full logical connectivity between nodes 111 include primary LSPs, NMS 120 may also determine one or more secondary LSPs which may be configured between nodes 111. In one such embodiment, for example, the secondary LSPs may be determined such that each secondary LSP provides a failover path for one of the primary LSPs, respectively.

In the example of FIG. 4, twelve of the twenty-four LSP paths are being used as the paths for the primary LSPs. In continuation of this example, the twelve remaining LSP paths not being used as the primary LSPs may be selected for use as the secondary LSPs (e.g., as protection for the primary LSPs). In this example, the secondary LSPs would use the following LSP paths: (3) A-B-X-C (supporting A-C); (5) A-C-X (supporting A-B-X); (6) A-C-X-B (supporting A-B); (9) B-X-C-A (supporting B-A); (11) B-A-C (supporting B-X-C); (12) B-A-C-X (supporting B-X); (15) X-C-A-B (supporting X-B); (17) X-B-A (supporting X-C-A); (18) X-B-A-C (supporting X-C); (20) C-A-B (supporting C-X-B); (21) C-A-B-X; (supporting C-X); and (24) C-X-B-A (supporting C-A). The secondary LSPs are omitted for purposes of clarity.

The LSPs 415 (once configured on nodes 111) will provide full logical connectivity between nodes 111. As described herein, each LSP provides a logical connection from a source node to a destination node using a hops list in order to specify the path to be taken by that LSP. The hops list for each LSP is determined by NMS 120. In the example of FIG. 4, for the additional LSPs 415 determined for nodes 111, LSP $415_7$ uses a hop list (A→B→X) configured on node $111_A$, LSP $415_8$ uses a hop list (B→X) configured on node $111_B$, LSP $415_9$ uses a hop list (C→X) configured on node $111_C$, LSP $415_{10}$ uses a hop list (B→X→C) configured on node $111_B$, LSP $415_{11}$ uses a hop list (X→C→A) configured on node $111_X$, and LSP $415_{12}$ uses a hop list (X→B) configured on node $111_X$. In an embodiment in which the secondary LSPs are determined (in addition to the primary LSPs 415), each secondary LSP also uses an associated hops list.

As described herein, after determining the modifications to the set of LSP paths based on the modified physical connectivity between nodes 411 and determining the modifications to the set of LSPs which provide full logical connectivity between nodes 411 (and, optionally, any additional LSPs), the NMS 120 generates configuration information adapted for configuring nodes 111 to support the LSPs of the set of LSPs which provide full logical connectivity. The NMS 120 propagates generated configuration information to nodes 111. The nodes 111 receive and process the configuration information from NMS 120, thereby resulting in provisioning of the LSPs within CN 410. A method according to one such embodiment is depicted and described with respect to FIG. 6.

Figure 5:
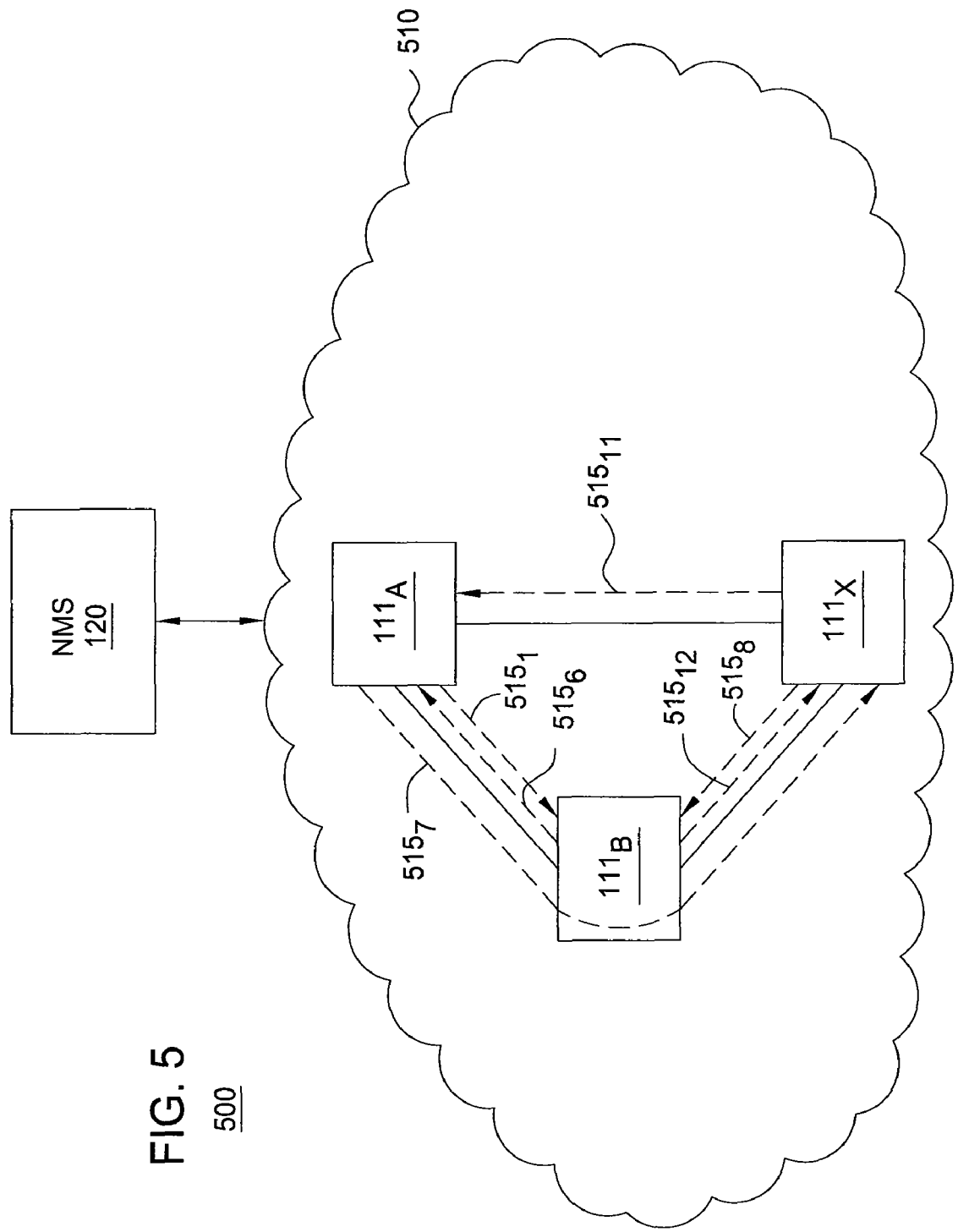
FIG. 5 depicts a high-level block diagram of the communication network of FIG. 4 in which an existing node has been removed from the communication network.

FIG. 5 depicts a high-level block diagram of the communication network of FIG. 4 in which an existing node has been removed from the communication network. Specifically, communication network 500 includes a CN 510 and NMS 120. The CN 510 of FIG. 4 is similar to CN 410 of FIG. 4, however, existing node $111_C$ has been removed from the ring topology. The node $111_C$ was disposed between node $111_A$ and node $111_X$ such that nodes $111_A$ and $111_X$ are now physically connected by a physical link (rather than each being physically connected to node $111_C$). The nodes $111_A$ and $111_X$ are configured for IP connectivity with each other. The nodes $111_A$ and $111_X$ may also be configured to support one or more routing protocols.

The removal of node $111_C$ from the network topology is a physical topology change event. The NMS 120 may be informed of the physical topology change event in any manner. In one embodiment, NMS 120 may learn of the removal of node $111_C$ using information entered via a user interface of NMS 120. In one embodiment, NMS 120 may learn of the removal of node $111_C$ using information received from CN 510. The information may be directly indicative of the physical topology change event or indirectly indicative of the physical topology change event (i.e., where NMS 120 may need to perform some processing of received information in order to detect the physical topology change event). The NMS 120 may learn of the physical topology change event in any other manner.

The NMS 120, in response to the physical topology change event, initiates processing adapted to maintain full logical connectivity between nodes 111 of CN 510. The NMS 120 determines changes to the set of LSP paths. The NMS 120 determines changes to the set of LSPs that are required to provide full logical connectivity between nodes 111 of CN 510. In this embodiment, since the physical topology change event involves the removal of an existing node from CN 510, the changes to the set of LSPs required to support full logical connectivity between nodes 111 of CN 510 includes modification of one or more existing LSPs (e.g., modifying the hops list(s) of one or more existing LSPs) and determination of one or more existing LSPs to be removed from the set of LSPs (since they are no longer required in order to maintain full logical connectivity between nodes 111 of CN 510).

The NMS 120 determines the set of all possible LSP paths for CN t410 based on the physical connectivity of nodes 111. In this embodiment, since the physical topology change event involves the removal of existing node $111_C$ from CN 510, fewer LSP paths are supported by CN 510 (as compared with CN 410). The NMS 120 may replace the existing set of LSP paths or modify the existing set of LSP paths (i.e., by determining how the existing set of LSP paths has changed based on the physical topology change event). As depicted in FIG. 5, since the physical topology of CN 510 is a three-node ring, the set of all possible LSP paths which may be supported by nodes 111 includes 12 LSP paths (including a subset of the LSP paths supported by CN 410).

The set of all possible LSP paths includes the following LSP paths (in terms of the subscripts by which nodes 111 are identified, where the first node in the list is the source of the LSP path and the last node in the list is the destination of the LSP path): (1) A-B; (2) A-B-X; (3) A-X; (4) A-X-B; (5) B-A; (6) B-A-X; (7) B-X; (8) B-X-A; (9) X-A; (10) X-A-B; (11) X-B; and (12) X-B-A. In the example of FIG. 5, 6 out of the 24 LSP paths of the previous set of LSP paths (i.e., the LSP paths A-B, A-B-X, X-B, X-B-A, B-A, and B-X for CN 410) are included in the modified list of LSP paths and 6 new LSP paths are included in the modified list of LSP paths.

The NMS 120 determines the set of LSPs that is required to provide full logical connectivity between nodes 111 of CN 510. The NMS 120 determines the changes to the set of LSPs using the set of LSPs and the modified set of all possible LSP paths between nodes 111. As depicted in FIG. 5, since there are two possible LSP paths from every node 111 to every other node 111, and full logical connectivity between nodes 111 may be provided using logical connections from every node 111 to every other node 111, the set of LSPs which provides full logical connectivity between nodes 111 includes 6 LSPs (which use 6 of the 12 LSP paths determined by NMS 120).

The NMS 120 determines that the removal of node $111_C$ from between nodes $111_A$ and $111_X$ does not impact LSPs $415_1$, $415_6$, $415_7$, $415_8$, or $415_{12}$ because none of these LSPs follows an LSP path that traversed node $111_C$. In other words, LSPs $415_1$, $415_6$, $415_7$, $415_8$, or $415_{12}$ may each continue to function without any modification (i.e., without any modification to the existing hops paths associated with these LSPs and, thus, without any reconfiguration of the associated nodes 111) in order to provide bidirectional logical connectivity between nodes $111_A$ and $111_B$ and between nodes $111_B$ and $111_X$, and to provide unidirectional connectivity from node $111_A$ to node $111_X$. As depicted in FIG. 4, these unmodified LSPs are denoted as LSPs $515_1$, $515_6$, $515_7$, $515_8$, and $515_{12}$.

The NMS 120 determines that the removal of node $111_C$ from between nodes $111_A$ and $111_X$ does impact LSP $415_{11}$ because this LSP followed a path between nodes $111_A$ and $111_X$ that traversed node $111_C$. The NMS 120 determines the impact to the hops list for LSP $415_{11}$. The hops list for LSP $415_{11}$ is updated from X-C-A to X-A such that traffic from node $111_X$ to node $111_A$ is routed directly (rather than being routed via intermediate node $111_C$, which has been removed from the network topology in CN 510). As depicted in FIG. 5, this modified LSP is denoted as LSP $515_{11}$.

If FRR capability has been properly configured in CN 510, traffic may continue to flow within CN 510 while the LSPs are being modified. In this case, the nodes adjacent to the removed node $111_C$ will detect that the communication links have been severed and will automatically reorient the traffic from the primary LSPs toward the FRR in order to avoid the severed segments. In the ring topology of CN 510, this may mean that the traffic will be rerouted back in the other direction on the ring (i.e., back through the source node) and then be delivered to the destination using the alternative route.

The NMS 120 identifies any excess LSPs that are no required to maintain full logical connectivity between nodes 111 of CN 510. The NMS 120 may identify the excess LSPs in any manner. In one embodiment, NMS 120 may identify the excess LSPs using the modified set of LSP paths (e.g., by identifying any LSPs using LSP paths that are no longer included in the set of LSP paths). In one embodiment, NMS 120 may identify the excess LSPs using respective hops lists associated with LSPs (e.g., identifying any LSPs having associated hops lists that include a node that has been removed from the network). The NMS 120 may identify excess LSPs in any other manner.

In the example of FIG. 5, the excess LSPs (i.e., the LSPs 415 of CN 410 that are no longer required to provide full logical connectivity between nodes 111 of CN 510) include the following LSPs: $415_2$ (which terminated on node $111_C$), $415_3$ (which originated on node $111_C$), $415_4$ (which terminated on node $111_C$), $415_5$ (which terminated on node $111_C$), $415_9$ (which originated on node $111_C$), and $415_{10}$ (which terminated on node $111_C$). In other words, each LSP 415 for which removed node 111C was a source node and each LSP 415 for which removed node 111C was a destination node are no longer required and, thus, may be removed from CN 510 based on modified network topology.

In one embodiment, in which LSPs 415 of CN 410 are primary LSPs and other LSPs are also provisioned within CN 410 (e.g., secondary LSPs), NMS 120 also determines modifications to the set(s) of other LSPs. For example, where a secondary LSP was provisioned for each primary LSP 415 of CN 410, NMS 120 determines any modifications to existing secondary LSPs (e.g., modifying hops lists) and identifies any excess secondary LSPs that are no longer required in CN 510. Since the secondary LSPs follow different LSP paths than their associated primary LSPs, the modifications to the set of secondary LSPs are different than the modifications to the set of primary LSPs 415.

The LSPs 515 (once provisioned on nodes 111) will provide full logical connectivity between nodes 111. As described herein, each LSP provides a logical connection from a source node to a destination node using a hops list in order to specify the path to be taken by that LSP. The hops list for each LSP is determined by NMS 120. In the example of FIG. 4, for the LSP 515 maintained for nodes 111, LSP $515_1$ uses a hop list (A→B) configured on node $111_A$, LSP $515_6$ uses a hop list (B→A) configured on node $111_B$, LSP $515_7$ uses a hop list (A→B→X) configured on node $111_A$, LSP $515_B$ uses a hop list (B→X) configured on node $111_B$, LSP $415_{11}$ uses a hop list (X→A) configured on node $111_X$, and LSP $415_{12}$ uses a hop list (X→B) configured on node $111_X$. In an embodiment in which secondary LSPs are provisioned (in addition to primary LSPs 515), each secondary LSP also uses an associated hops list.

As described herein, after determining the modifications to the set of LSP paths based on the modified physical connectivity between nodes 111 and determining the modifications to the set of LSPs which provide full logical connectivity between nodes 111 (and, optionally, any additional LSPs), the NMS 120 generates configuration information adapted for configuring nodes 111 to support the LSPs of the set of LSPs which provide full logical connectivity. The NMS 120 propagates generated configuration information to nodes 111. The nodes 111 receive and process the configuration information from NMS 120, thereby resulting in provisioning of the LSPs within CN 510. A method according to one such embodiment is depicted and described with respect to FIG. 6.

Figure 6:
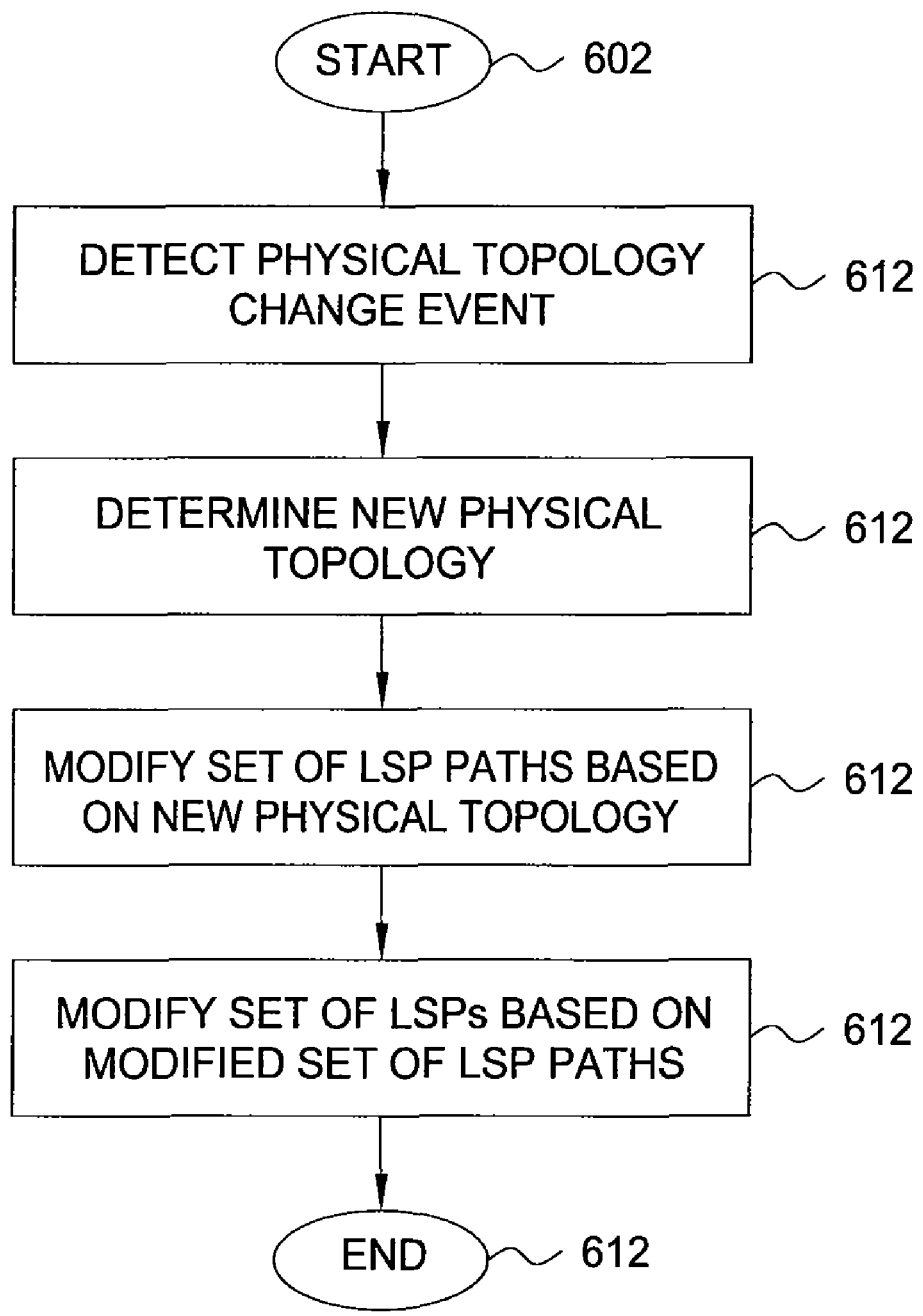
FIG. 6 depicts a method according to one embodiment of the present invention.

FIG. 6 depicts a method according to one embodiment of the present invention. Specifically, method 600 of FIG. 6 includes a method for modifying a set of LSPs in response to a physical topology change event (e.g., addition of a node to the network topology, removal of a node from the network topology, and the like). Although depicted and described as being performed serially, at least a portion of the steps of method 600 of FIG. 6 may be performed contemporaneously, or in a different order than depicted and described with respect to FIG. 6. The method 600 begins at step 602 and proceeds to step 604.

At step 604, a physical topology change event is detected. The physical topology change event may be any event resulting in modification of the physical connectivity of the nodes of the network (e.g., addition of a node to the network, removal of a node from the network, moving the location of a node within the network, and the like). The physical topology change event may be detected in any manner (e.g., from information entered in a management system via a user interface, from information received at a management system from the network, and the like).

At step 606, a new physical topology of the network is determined. The new physical topology of the network is determined in response to the physical topology change event. In one embodiment, incremental processing may be performed to evaluate new physical connectivity information in order to determine changes to the physical topology of the network. In one embodiment, full processing may be performed to evaluate all available physical connectivity information in order to re-determine the entire physical topology of the network. The new physical topology may be determined in other ways.

At step 608, the set of LSP paths is modified based on the new physical topology of the network. The set of LSP paths may be modified in a number of ways. The set of LSP paths may be modified incrementally (e.g., by maintaining the previous set of LSP paths and modifying it as required) or fully (e.g., by discarding the previous set of LSP paths and re-determining a new set of LSP paths).

In one embodiment, in which a node is added to the network, modifying the set of LSP paths includes adding LSP paths to the set of LSP paths (e.g., adding at least two LSP paths between the added node and every other node in the network based on the physical connectivity of the network). In such an embodiment, the modifying of the set of LSP paths may also include modifying one or more of the existing LSP paths to reflect the addition of the node (e.g., each LSP that currently traverses the added node must reflect the addition of that node to the path).

In an embodiment in which a node is removed from the network, modifying the set of LSP paths includes deleting LSP paths from the set of LSP paths (e.g., deleting all LSP paths for which the removed node was an endpoint of the LSP path). In such an embodiment, the modifying of the set of LSP paths may also include modifying one or more of the existing LSP paths to reflect the removal of the node (e.g., each LSP that previously traverses the removed node must reflect the removal of that node from the path).

At step 610, the set of LSPs is modified based on the modified set of LSP paths. The set of LSPs may be modified in a number of ways. The set of LSPs may be modified incrementally (e.g., by maintaining the previous set of LSPs and modifying it as required) or fully (e.g., by discarding the previous set of LSPs and re-determining a new set of LSPs).

In one embodiment, in which a node is added to the network, modifying the set of LSPs includes adding LSPs to the set of LSPs (e.g., adding at least two LSPs (one in each direction) between the added node and every other node in the network). In such an embodiment, the modifying of the set of LSPs may also include modifying one or more of the existing LSPs to reflect the addition of the node. For example, where the LSPs are strict dynamic LSPs, the hops list of one or more LSPs may be modified to reflect the addition of the node to the path used by the LSP).

In one embodiment, in which a node is removed from the network, modifying the set of LSPs includes deleting LSPs from the set of LSPs (e.g., deleting all LSPs for which the removed node was an endpoint of the LSP). In such an embodiment, the modifying of the set of LSPs may also include modifying one or more of the existing LSPs to reflect the removal of the node. For example, where the LSPs are strict dynamic LSPs, the hops list of one or more LSPs may be modified to reflect the removal of the node from the path used by the LSP).

At step 612, method 600 ends. Although depicted and described as ending (for purposes of clarity), processing is performed to ensure that each LSP that is included in the modified set of LSPs is provisioned in the network. In one embodiment, a determination is made as to which of the LSPs in the modified set of LSPs require configuration (e.g., since not all existing LSPs are necessarily impacted by a network topology change event, configuration information may only need to be generated and propagated to the network for a subset of the LSPs in the modified set of LSPs). The required configuration information is generated and propagated to the network for the impacted LSPs.

Although primarily depicted and described herein with respect to an embodiment in which NMS 120 attempts to minimize the impact to CN 410 in order to provide full logical connectivity in response to a physical topology change event, in other embodiments NMS 120 may determine the set of LSPs required to provide full logical connectivity by ignoring the previous set of LSPs that provided full logical connectivity prior to the physical topology change event. In one such embodiment, NMS 120 performs a method as depicted and described herein with respect to FIG. 2 and FIG. 3 in response to each physical topology change event.

Although primarily depicted and described herein with respect to specific physical topology change events (namely, addition of a new node to a network and removal of an existing node from a network), logical connectivity determination/provisioning functions depicted and described herein may be performed in response to other physical topology change events (e.g., moving an existing node from one position in the network to another position in the network, physical link failure conditions, physical link overload conditions, and the like, as well as various combinations thereof).

Although primarily depicted and described herein with respect to initial determination and provisioning of logical connectivity within a network, and subsequent modifications of logical connectivity of the network in response to physical topology change events detected for the network, logical connectivity determination and provisioning functions depicted and described herein may be applied in many other ways.

In one embodiment, for example, logical connectivity determination and provisioning functions may be used to verify logical connectivity of a network (e.g., as a test to ensure that full logical connectivity based on the physical connectivity is currently supported). In this embodiment, if a determination is made that full logical connectivity is not supported, corrective actions may be initiated (e.g., determining LSP paths, modifying LSP configuration information (e.g., hops lists, endpoint information, and the like), adding any missing LSPs required for full logical connectivity, removing any excess LSPs not required for full logical connectivity, and the like, as well as various combinations thereof).

In one embodiment, for example, logical connectivity determination and provisioning functions may be used to determine the physical topology of a network using the logical connectivity of the network (e.g., using LSPs known to be provisioned in the network). In one such embodiment, for example, a method for determining a physical topology of a network based on logical connectivity of the network includes identifying a plurality of label switched paths (LSPs) configured in the network, determining, for each identified LSP, a hops list used by that LSP for routing traffic within the network, and determining the physical topology of the network using the determined hops lists.

Although primarily depicted and described herein with respect to embodiments in which a network management system (illustratively, NMS 120) performs the logical connectivity determination/provisioning functions described herein, in one embodiment at least a portion of the logical connectivity determination/provisioning functions described herein may be performed by one or more of the nodes of the network for which logical connectivity is determined/provisioned (e.g., in a centralized fashion by one node that has been assigned as a controller, in a distributed fashion by multiple nodes, and the like).

Figure 7:
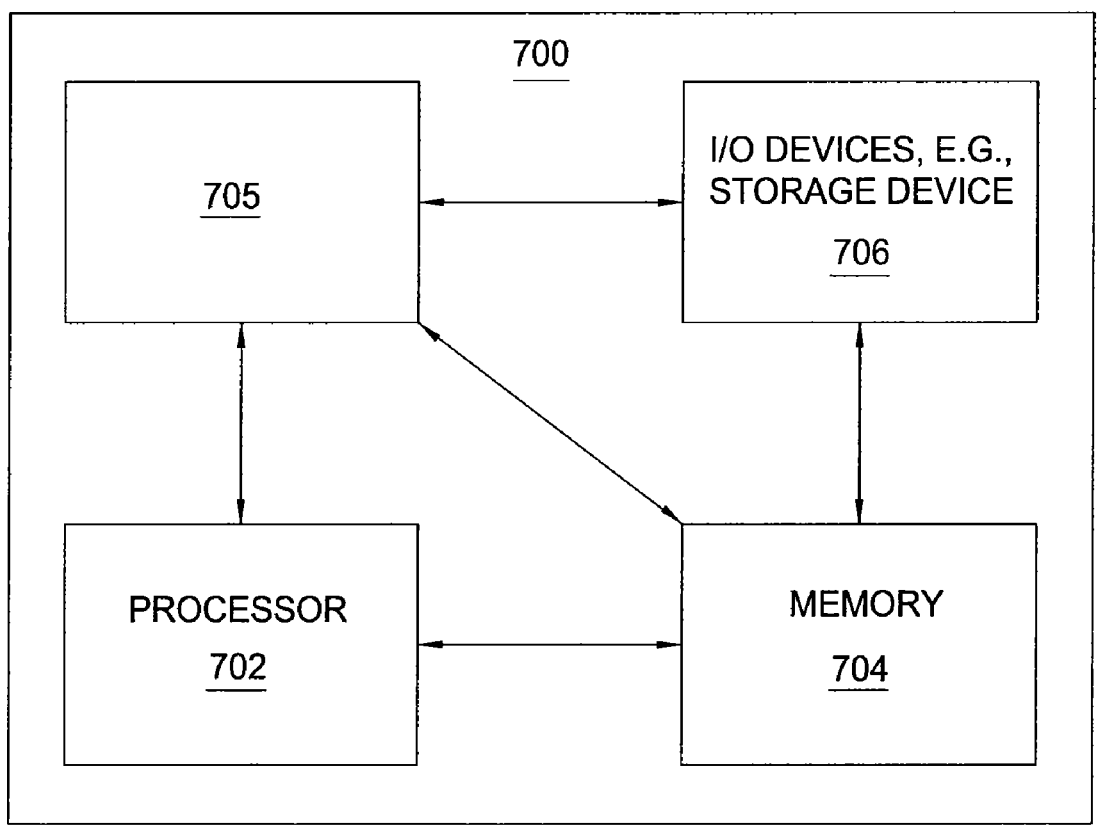
FIG. 7 depicts a high-level block diagram of a general-purpose computer suitable for use in performing the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), an LSP provisioning module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present LSP provisioning process 705 can be loaded into memory 704 and executed by processor 702 to implement the functions as discussed above. As such, LSP provisioning process 705 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for configuring logical connectivity for a network comprising a plurality of nodes, comprising:

means for determining a physical topology of the network using information indicative of physical connectivity between nodes of the network;

means for determining, based on the physical topology of the network, a set of label switched path (LSP) paths comprising, for each pair of nodes in the network, at least two logical paths between the nodes of the node pair; and means for determining, using the set of LSP paths, a set of LSPs comprising a plurality of LSPs adapted for providing full logical connectivity between the nodes of the network;

means for determining a new physical topology of the network in response to a physical topology change event;

means for modifying the set of LSP paths based on the new physical topology of the network, wherein the set of LSP paths comprises, for each pair of nodes in the network, at least two logical paths between the nodes of the node pair;

means for modifying the set of LSPs based on the new physical topology of the network, wherein the set of LSPs is modified in a manner for maintaining full logical connectivity between the nodes of the network.

2. The apparatus of claim 1, wherein the means for determining the physical topology of the network comprises:

means for receiving physical connectivity information describing a plurality of physical connections between the nodes of the network; and means for processing the physical connectivity information to determine the physical topology of the network.

3. The apparatus of claim 2, wherein the means for determining the physical topology of the network comprises:

means for listening to routing update messages exchanged within the network; and means for processing the routing update messages to determine the physical topology of the network.

4. The apparatus of claim 1, wherein the means for determining the set of LSP paths comprises:

means for selecting each of the nodes of the network as a source node;

means for determining, for each node selected as a source node, for each of the other ones of the nodes of the network, each of at least one path from the selected source node to the other one of the nodes; and means for adding the determined paths for each source node to the set of LSP paths.

5. The apparatus of claim 1, wherein the means for determining the set of LSPs comprises:

means for selecting ones of the LSP paths from the set of LSP paths, wherein the selected ones of the LSP paths are adapted to provide full logical connectivity between the nodes of the network.

6. The apparatus of claim 1, wherein the means for determining the set of LSPs comprises:

means for selecting, for each pair of nodes in the network, a first one of the LSP paths providing a logical path between the nodes in a first direction and a second one of the LSP paths providing a logical path between the nodes in a second direction.

7. The apparatus of claim 1, further comprising:

means for generating configuration information adapted for configuring the nodes of the network to support the LSPs; and means for propagating the configuration information toward the nodes of the network.

8. The apparatus of claim 7, wherein, for each LSP, the configuration information includes at least one of a hops list to be used for the LSP and endpoint information to be used for the LSP.

9. The apparatus of claim 1, wherein the LSPs comprise primary LSPs, the apparatus further comprising:

means for determining at least one additional LSP using the set of LSPs and the set of LSP paths.

10. The apparatus of claim 9, wherein the at least one additional LSP comprises at least one of at least one secondary LSP and at least one fast reroute (FRR) LSP protection hops list.

11. The apparatus of claim 1, wherein the LSPs comprise at least one of static LSPs, strict dynamic LSPs, and loose dynamic LSPs.

12. The apparatus of claim 1, wherein the physical topology change event comprises at least one of an addition of at least one node to the network, a deletion of at least one node from the network, a modification of a location of at least one node within the physical topology, a failure of a physical link, and a failure of a logical connection.

13. The apparatus of claim 1, wherein the means for modifying the set of LSP paths comprises:

means for adding at least one new LSP path to the set of LSP paths;

means for deleting at least one existing LSP path from the set of LSP paths; and means for modifying at least one existing LSP path of the set of LSP paths based on the new physical topology of the network.

14. The apparatus of claim 1, wherein the means or modifying the set of LSPs comprises:

means for adding at least one new LSP to the set of LSPs;

means for deleting at least one existing LSP from the set of LSPs; and means for modifying at least one existing LSP of the set of LSPs based on the new physical topology of the network.

15. The apparatus of claim 14, wherein the means for modifying the set of LSPs comprises:

means for identifying at least one of the LSPs of the set of LSPs that is using an LSP path impacted by the physical topology change event; and means for modifying, for each identified LSP, configuration information associated with the LSP.

16. The apparatus of claim 15, wherein the configuration information associated with the LSP comprises a hops list used by the LSP.

17. A method for configuring logical connectivity for a network comprising a plurality of nodes, comprising:

determining, using a processor, a physical topology of the network using information indicative of physical connectivity between nodes of the network;

determining, based on the physical topology of the network, a set of label switched path (LSP) paths comprising, for each pair of nodes in the network, at least two logical paths between the nodes of the node pair; and determining, using the set of LSP paths, a set of LSPs comprising a plurality of LSPs adapted for providing full logical connectivity between the nodes of the network;

determining, a new physical topology of the network in response to a physical topology change event;

modifying the set of LSP paths based on the physical topology of the network, wherein the set of LSP paths comprises, for each pair of nodes in the network, at least two logical paths between the nodes of the node pair; and modifying the set of LSPs based on the physical topology of the network, wherein the set of LSPs is modified in a manner for maintaining full logical connectivity between the nodes of the network.

18. The method of claim 17, wherein the method is performed autonomously by a computer system.

19. The method of claim 17, wherein the method is performed autonomously by a computer system.

20. A method for autonomously determining a physical topology of a network based on logical connectivity of the network, comprising:

identifying, using a processor, a plurality of label switched paths (LSPs) configured in the network;

determining, for each identified LSP, a hops list used by that LSP for routing traffic within the network; and determining the physical topology of the network using the determined hops lists;

determining, a new physical topology of the network in response to a physical topology change event;

modifying the set of LSP paths based on the physical topology of the network; and modifying the set of LSPs based on the physical topology of the network, wherein the set of LSPs is modified in a manner for maintaining full logical connectivity between the nodes of the network.

\* \* \* \* \*